United States Patent
Vasvani (10) Patent No.: US 10,877,618 B2
(45) Date of Patent: Dec. 29, 2020

(54) REMOVAL OF LISTINGS BASED ON SUPERIORITY

(71) Applicant: StubHub, Inc., San Francisco, CA (US)

(72) Inventor: Girish Vasvani, Fremont, CA (US)

(73) Assignee: STUBHUB, INC., San Francisco, CA (US)

( * ) Notice: Subject to any disclaimer, the term of this patent is extended or adjusted under 35 U.S.C. 154(b) by 770 days.

(21) Appl. No.: 15/240,834

(22) Filed: Aug. 18, 2016

(65) Prior Publication Data

US 2018/0052935 A1     Feb. 22, 2018

(51) Int. Cl.
*G06F 3/0481* (2013.01)
*G06Q 10/02* (2012.01)
*G06F 16/9535* (2019.01)

(52) U.S. Cl.
CPC ........ *G06F 3/0481* (2013.01); *G06F 16/9535* (2019.01); *G06Q 10/02* (2013.01)

(58) Field of Classification Search
CPC ............... G06F 3/0481; G06F 16/9535; G06F 16/2423; G06F 16/355; G06Q 10/02; G06Q 30/0641
See application file for complete search history.

(56) References Cited

U.S. PATENT DOCUMENTS

| | | |
|---|---|---|
| 2003/0069827 A1 | 4/2003 | Gathman et al. |
| 2010/0217663 A1* | 8/2010 | Ramer ............... G06F 16/9535 705/14.42 |
| 2012/0166960 A1 | 6/2012 | Salles |
| 2012/0173310 A1* | 7/2012 | Groetzinger ....... G06Q 30/0207 705/14.1 |
| 2015/0105134 A1 | 4/2015 | Cobb et al. |
| 2015/0287119 A1 | 10/2015 | Bhan et al. |
| 2016/0148125 A1 | 5/2016 | Paleja et al. |

FOREIGN PATENT DOCUMENTS

WO     2018/034824 A1     2/2018

OTHER PUBLICATIONS

International Search Report received for PCT Application No. PCT/US2017/044354, dated Oct. 5, 2017, 2 pages.
International Written Opinion received for PCT Application No. PCT/US2017/044354, dated Oct. 5, 2017, 6 pages.
International Preliminary Report on Patentability received for PCT Application No. PCT/US2017/044354, dated Feb. 28, 2019, 8 pages.
Extended European Search Report, as issued in connection with European Application No. 17841836.4, dated Mar. 5, 2020, 8 pgs.

* cited by examiner

*Primary Examiner* — Ajay M Bhatia
*Assistant Examiner* — Mong-Shune Chung
(74) *Attorney, Agent, or Firm* — Maschoff Brennan (57) ABSTRACT

A method of generating a user-interface to be displayed at a remote location may include receiving a search request for an item listing receiving a search request for an event at a venue with multiple rows. The method may also include retrieving a first listing and a second listing in a same row of the multiple rows based on the search request, and determining which of the first listing and the second listing is a listing selected for display and which is a listing selected to not be displayed. The method may additionally include generating instructions to be transmitted to a remote location to generate a user interface to be displayed at the remote location, the user interface including the listing selected for display and excluding the listing selected to not be displayed, and transmitting the instructions to the remote location.

20 Claims, 9 Drawing Sheets

REMOVAL OF LISTINGS BASED ON SUPERIORITY

FIELD

The embodiments discussed herein are related to the removal of listings based on superiority.

BACKGROUND

With the large volume of listings of goods, services, and the like available for purchase on the Internet, a user can very easily become overwhelmed with a presented number of listings. For example, a user may search for an item for sale and be presented with thousands of listings.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

One of the problems unique to computers, and in particular, to the Internet, involves presenting a constantly changing collection of large numbers of listings of items for sale in a meaningful way to users. For example, a user seeking to purchase a ticket to an event over the Internet may be required to sift through tens or even hundreds of thousands of potential tickets, with that list of potential tickets changing as other consumers reserve, release, purchase, and return tickets. Furthermore, many users seeking to purchase a ticket do so using a device with limited display capabilities, such as a mobile phone or a tablet. Such limited display capability devices exacerbate the problem for a user trying to find a ticket that meets the expectations of the user among the many listings.

At least some embodiments of the present disclosure resolve these difficulties by comparing multiple listings within the same row for an event, and displaying only the listing to the user determined to be a superior listing among the listings in the row, rather than all of the listings for the row. Determining which listing in the row is superior may be determined in a variety of ways. For example, if the user has shown a sensitivity to price, the superior listing may be the least expensive listing. Alternatively or additionally, if the user has shown a preference for an aisle seat, the lowest price aisle seat may be the superior listing. Alternatively or additionally, if the user has shown a preference for the best view, the seat in the row with the best view may be the superior listing, etc. Additionally, a variety of such factors may be utilized in determining which listing is the superior listing.

By removing listings from the display provided to a user, a number of benefits may be achieved. For example, a user may have a shorter list of more pertinent listings for their review and selection, increasing the likelihood of the user purchasing from the listings. As another example, because the list of results is shortened, less information may be transmitted to and stored by the user, preserving bandwidth and storage requirements of the device of the user. As an additional example, if the user is using a device with constrained or limited display properties, for example a mobile device, the more pertinent results may be more prominently and easily viewable on the limited display.

Figure 1:
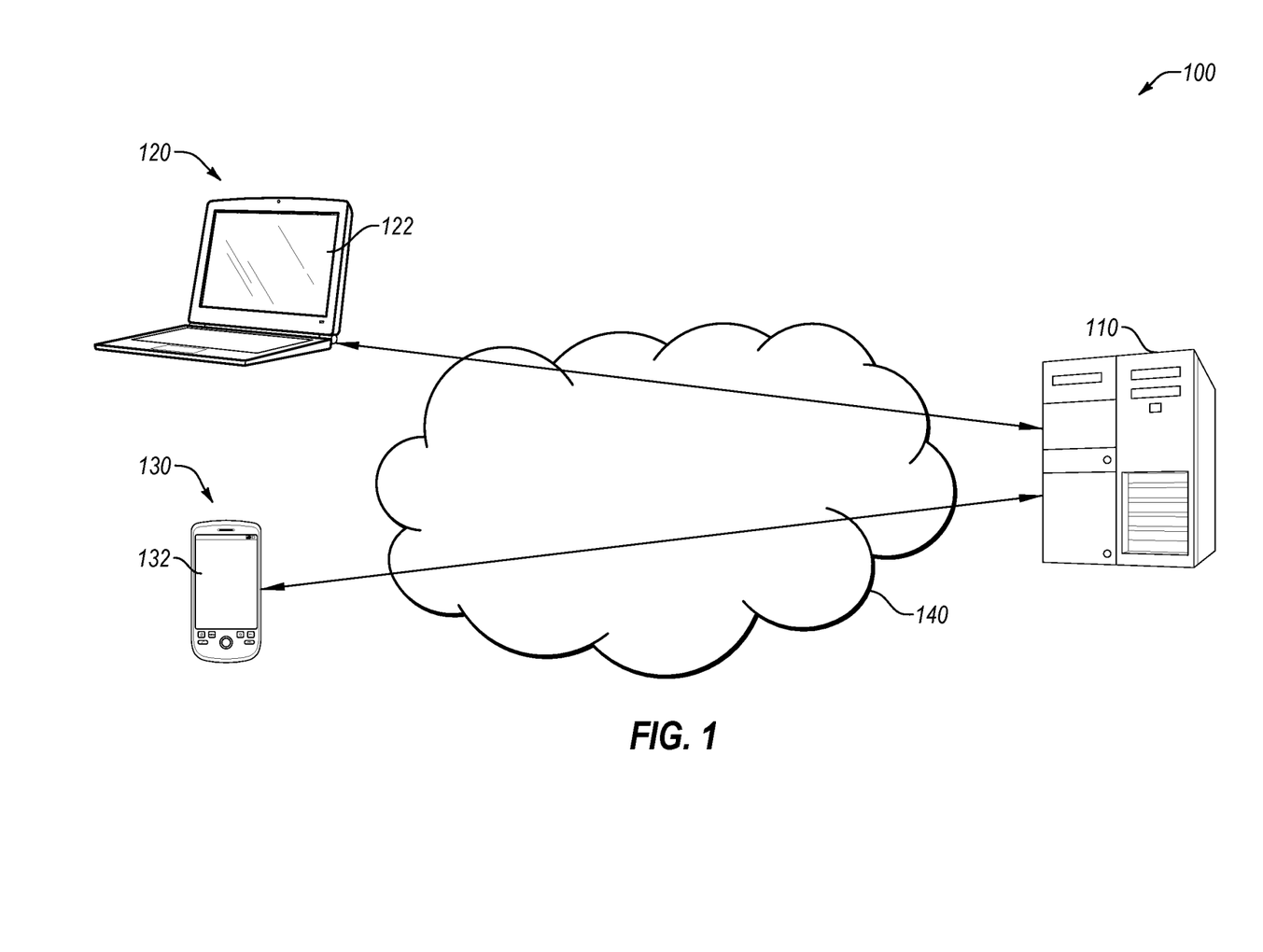
FIG. 1 illustrates an example system that may be used to present listings to a user.

Turning to the figures, FIG. 1 illustrates an example system 100 that may be used to present listings to a user, in accordance with one or more embodiments of the present disclosure. The system 100 may include a server 110, a first device 120 with a display 122, a second device 130 with a display 132, and a network 140. The first device 120 and/or the second device 130 may submit a search request or otherwise query the server 110 for listings of goods or services for sale, for example, for tickets to an event at a venue with multiple rows. The server 110 may generate instructions that direct or instruct the requesting device to generate a user interface to be displayed at the requesting device.

For example, a user operating the first device 120 may request a listing of tickets for sale at a given venue on a given date. The request may be transmitted from the first device 120 over the network 140 to the server 110. The server 110 may retrieve all listings of tickets at the given venue on the given date as a first set. The server 110 may reduce the number of results to be displayed by removing listings from the first set such that at least one listing for a row is selected for display and at least one listing is selected to not be displayed and is removed from the listings to be displayed for the row. The listing selected for display may be referred to as a superior listing, and the listing selected not to be displayed may be referred to as an inferior listing. In accordance with the present disclosure, the terms "superior" and "inferior" may refer to a category to which a listing belongs, or a deliberate selection or non-selection after an analysis of listings (e.g. for display), rather than an actual attribute of a listing.

For example, for two listings in the same row for a first set of listings retrieved in response to a search request, the server 110 may compare properties in common between the two listings. Examples of such properties may include date, price, location properties (e.g., venue, seat, zone, section, etc.), view (e.g., obstructed, elevated, normal), delivery method (e.g., will-call, deliver by mail, print), quantity (e.g., two tickets, three tickets, etc.), payment method (e.g., credit card, PayPal®, cash-on-delivery), or seat features (e.g., access to VIP lounge, tail-gating access, food or drinks included, etc.). Based on which of the two listings is superior, the inferior listing may be removed and the superior listing may be retained for display to the user. In other words, one of the two listings may be selected for display and the other listing may be deliberately selected for removal from display. Additionally or alternatively, the inferior listing may be removed from the set or otherwise excluded from being provided to the user. For example, the inferior listing may be transmitted to the user's device but flagged in such a way that the inferior listing is not displayed, or the inferior listing may not be transmitted to the user's device.

In some embodiments, determining superiority may be based on a single property (e.g., lowest price) or multiple properties (e.g., lowest price and best view). Superiority may be based on a default determination set by the server 110, for example by being pre-selected by an administrator, or may include a set of parameters or filters selected by the user. For example, a user at the first device 120 may select one or more user preferences for a property or feature that is more important to the user, such as price, aisle seat, view, etc. In these and other embodiments, the server 110 may remove all but the most superior listing from each row. Stated another way, a first listing that fulfills search requirements of a user may be placed in a set of listings to be displayed. A next listing that also fulfills the search requirements and is in the same row may also be selected. Between the next listing and the first listing, only the superior listing may be in the set of listings to be displayed and the inferior listing may be removed from the set.

In some embodiments, the superiority determination may include a weighting factor for one or more of the properties of a listing. For example, a price property may be weighted differently than a payment options property such that variations in price may more significantly affect whether one listing is superior to another, e.g., between a first ticket on a row that is fifteen percent cheaper than a second ticket that has a user-preferred method of payment, the first ticket may be superior.

In determining superiority, in some embodiments, some properties may have a reasonably clear superior value. For example, a lower price, or a better/more clear view, etc. may provide for a superior listing. Additionally or alternatively, some properties may not have a clear superiority position, such as payment method, delivery method, etc., as such properties may represent purchaser preference. For properties with multiple options available (e.g., a seller accepting multiple forms of payment), the more options (e.g., a seller that accepts credit cards, wire transfers, PAYPAL®, etc.) and/or the more commonly used option (e.g., credit card) may be superior by default. In these and other embodiments, superiority may be based on a default selection made by the server 110 (e.g., based on price). Such a default may be pre-selected by a system administrator for the server 110. Additionally or alternatively, superiority may be based on a user selecting which properties may factor into a superiority determination between two listings and/or by selecting other user preferences that may vary across users (e.g., some users may prefer an aisle seat for easier access to their seat and the aisle, while others may prefer a seat in the middle of the row so other attendees do not have to pass them to get to their seats). Such a selection may be selected by a user prior to submitting a search request, or stated another way, may be a pre-selection.

In some embodiments, superiority between two listings may be determined by comparing values of properties in a sequential order. For example, price may be compared first, followed by seat features, then payment methods, etc. If two listings in a row are determined to be indistinguishable, the first listing read or retrieved by the server 110 may be included in the user interface and the second listing may be removed. Additionally or alternatively, the server 110 may utilize a default such as the seat closest to the aisle may be the superior seat.

In some embodiments, a determination as to whether or not to limit listings based on superiority may be based at least in part on the display properties of the display of the requesting device. For example, the display 122 of the first device 120 may have a larger display area and higher resolution than the display 132 of the second device 130. If the requesting user were using the first device 120, the listings may not be limited based on superiority by default, and it may be a feature to be invoked by the user. Additionally or alternatively, if the requesting user were using the second device 130, limiting listings based on superiority may be invoked automatically without a user selection. In these and other embodiments, additional listings to be presented may be removed because of the limited display properties of the display 132.

In some embodiments, the listings may include both primary and secondary listings. For example, the first listing may be a listing from the actual owner or proprietor of the event, or in other words a primary listing. Continuing the example, the second listing may be a listing of a third party individual or service that is reselling a ticket already purchased or otherwise acquired from the owner or proprietor of the event, or in other words a secondary listing. In these and other embodiments, primary listings and secondary listings may be treated the same in determining superiority.

Figure 5A:
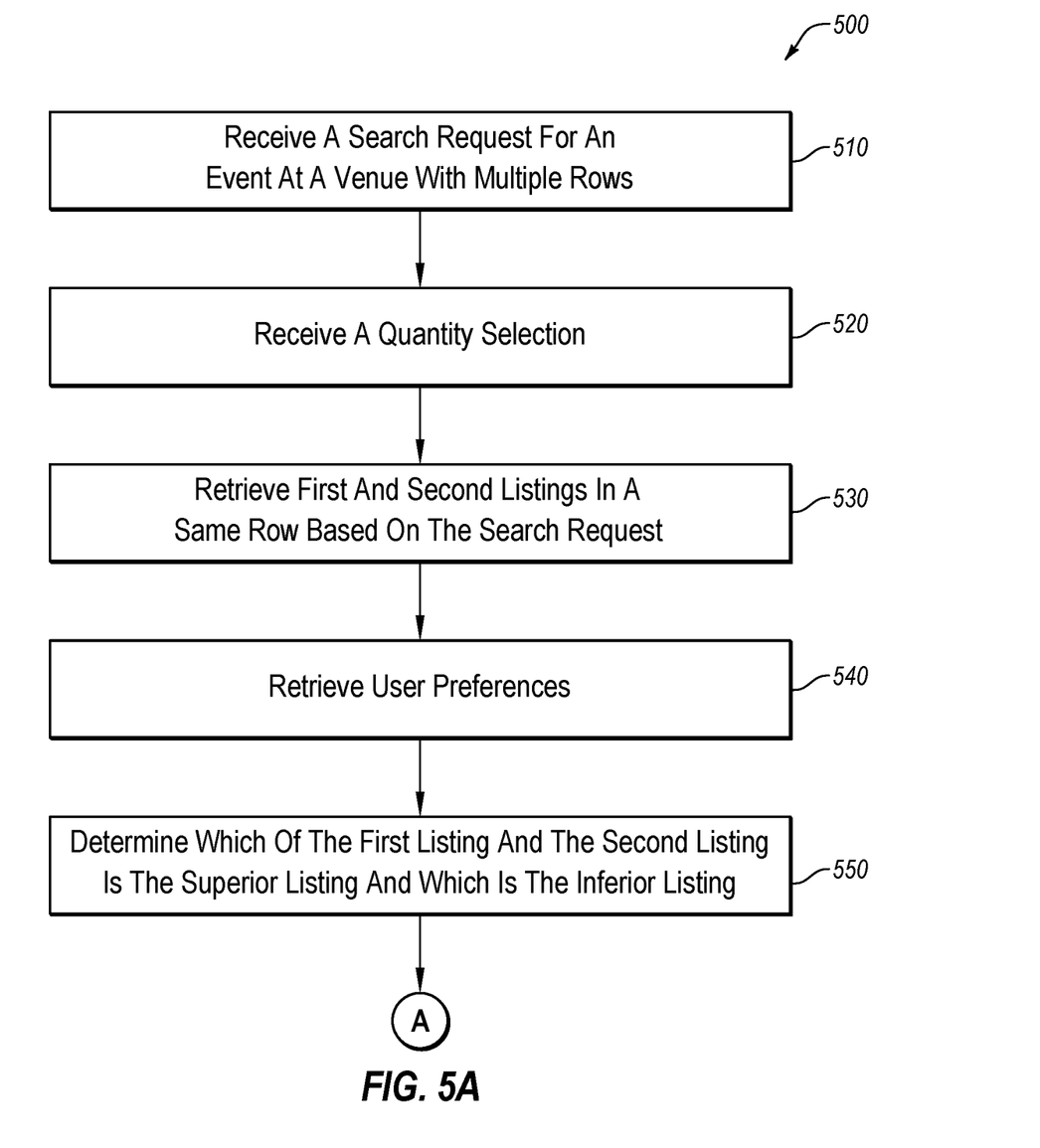
FIGS. 5A-5B illustrate a flowchart of an example computer-implemented method of removal of listings based on superiority.
Figure 5B:
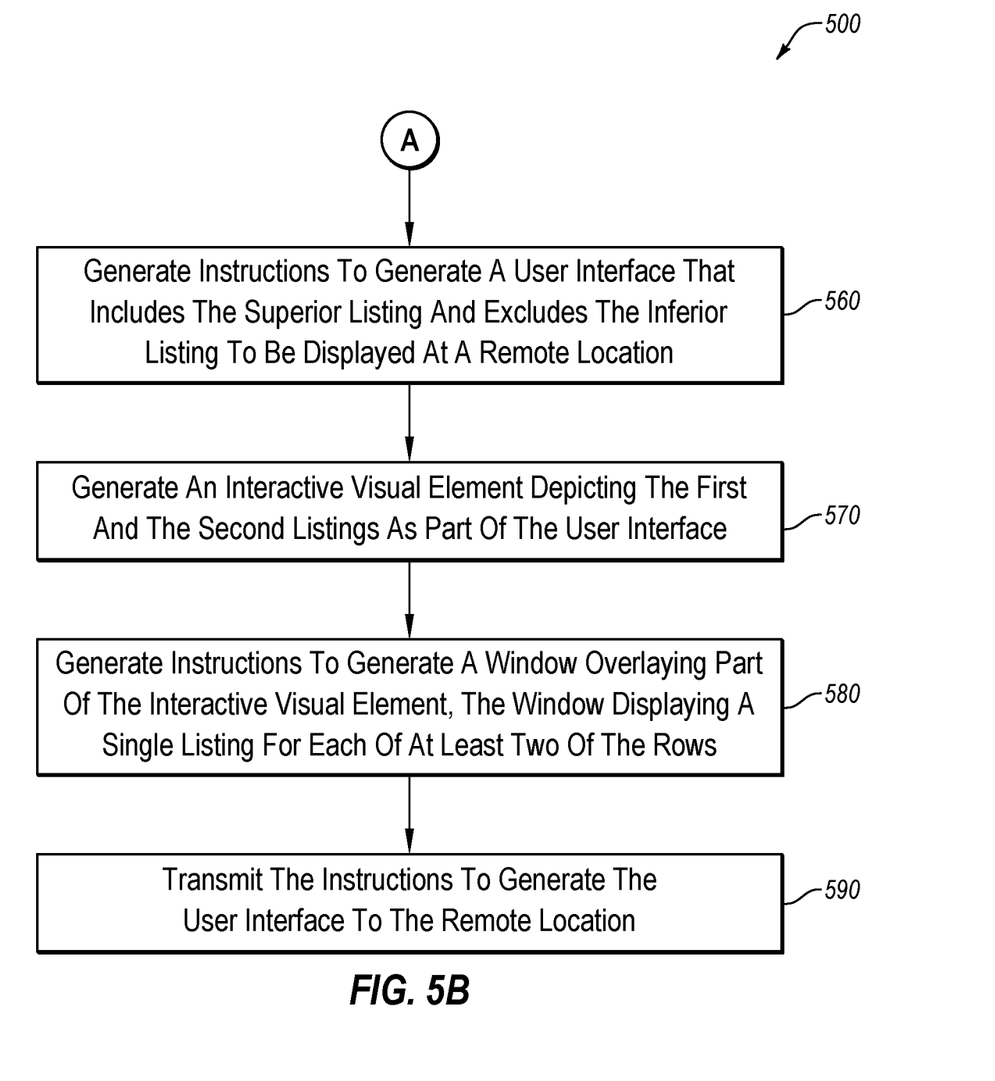

The server 110 may include any system, device, component, or combinations thereof configured to receive a search request or query regarding listings and provide results. The server 110 may additionally be configured to perform one or more of the operations described in the present disclosure, such as one or more of the operations described with respect to FIG. 5. In some embodiments, the server 110 may include a processor, a memory, and a storage device. In these and other embodiments, the server 110 may operate as part of a network-based commerce system such as eBay®, StubHub®, etc. from which the server 110 may retrieve and/or process listings. The server 110 may be implemented as any device, such as a blade server, a rack server, a desktop, a laptop, a mobile device, a tablet, etc.

The first device 120 may include any system, device, component, or combinations thereof configured to allow a user to interact with the first device 120 to request listings from the server 110, and have the listings displayed to the user at the display 122. In some embodiments, the first device 120 may include a processor, a memory, and a storage device in addition to the display 122. The first device 120 may be implemented as any device, such as a blade server, a rack server, a desktop, a laptop, a mobile device, a tablet, etc. The second device 130 may be comparable or similar to the first device 120.

The network 140 may include any device, system, component, or combination thereof configured to provide communication between one or more of the server 110, the first device 120, and the second device 130. By way of example, the network 140 may include one or more wide area networks (WANs) and/or local area networks (LANs) that enable the server 110, the first device 120, and/or the second 130 to be in communication. In some embodiments, the network 140 may include the Internet, including a global internetwork formed by logical and physical connections between multiple WANs and/or LANs. Alternately or additionally, the network 140 may include one or more cellular RF networks and/or one or more wired and/or wireless networks such as, but not limited to, 802.xx networks, Bluetooth access points, wireless access points, IP-based networks, or the like. The network 140 may also include servers that enable one type of network to interface with another type of network. Additionally or alternatively, the network 140 may include an Intranet, or one or more computing devices in communication within an organization or an in otherwise secure manner.

Modifications, additions, or omissions may be made to FIG. 1 without departing from the scope of the present disclosure. For example, the system 100 may include more or fewer elements than those illustrated and described in the present disclosure. For example, the system 100 may include any number of devices or servers. As another example, the system 100 may include multiple or alternative servers hosting listings that the server 110 may query or otherwise request results from in response to a search request received from a user.

Figure 2A:
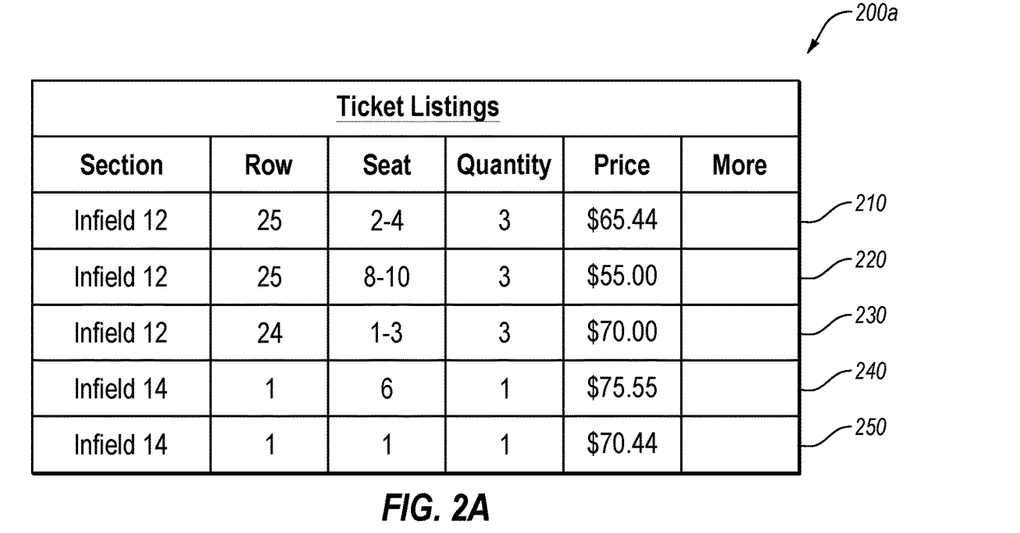
FIG. 2A illustrates an example of a first configuration of a user interface.
Figure 2B:
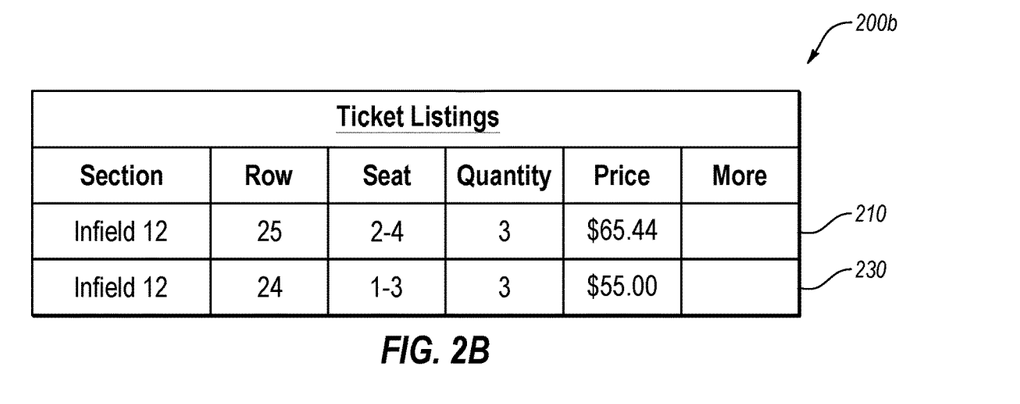
FIG. 2B illustrates an example of a second configuration of the user interface of FIG. 2A.
Figure 2C:
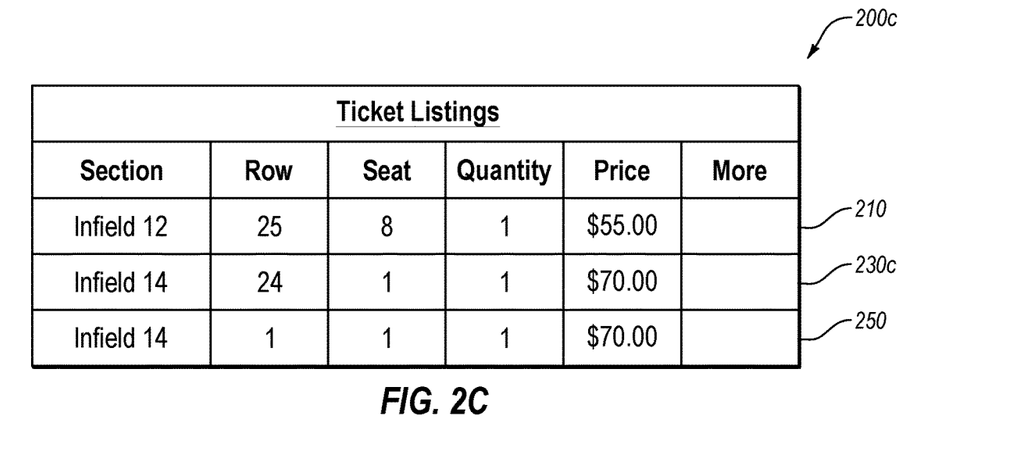
FIG. 2C illustrates an example of a third configuration of the user interface of FIG. 2A.

FIGS. 2A, 2B, and 2C illustrate an example of a first and second configuration of a user interface 200a, 200b, and 200c in accordance with one or more embodiments of the present disclosure. FIG. 2A may illustrate a user interface 200a without removing any listings, and FIGS. 2B and 2C may illustrate user interfaces 200b and 200c after removing listings in accordance with one or more embodiments of the present disclosure. FIG. 2B illustrates the user interface 200b after removal of listings after a user selection of a particular quantity, and FIG. 2C illustrates the user interface 200c after removal of listings without selection of a particular quantity.

For example purposes, the user interfaces 200a, 200b, and 200c illustrated in FIGS. 2A, 2B, and 2C illustrate listings of tickets for an event at a baseball diamond. The user interfaces 200a, 200b, and 200c may convey to the user one or more properties of the listings, such as Section, Row, Seat, Quantity (Qty), and Price as illustrated in FIGS. 2A, 2B, and 2C. The user interfaces 200a, 200b, and 200c also include a More link to allow the display of additional properties besides those illustrated.

With references to FIGS. 2A and 2B, in FIG. 2A, the user interface 200a includes a first listing 210, a second listing 220, a third listing 230, a fourth listing 240, and a fifth listing 250. In these and other embodiments, a user may select a certain quantity of tickets the user is seeking to purchase, such as three tickets for the purposes of this example. The first listing 210 and the second listing 220 may both include three or more tickets available for sale. The third listing 230 may include three or more tickets for sale and may be the only such offering on Row 24 and so may be retained for display. The fourth listing 240 and fifth listing 250 may not include the user-selected quantity and so may be removed from display.

As between the first listing 210 and the second listing 220, the second listing 220 may have a lower price and so may be selected as a superior listing and the first listing 210 may be selected as an inferior listing. As illustrated in the user interface 200b of FIG. 2B, the first listing 210 may be removed such that only a single listing for the Row 25 may remain displayed on the user interface 200b, despite the first listing 210 including a sufficient quantity of tickets.

With reference to FIGS. 2A and 2C, a user may not have selected a specific quantity of tickets or may have selected a quantity of one ticket. The first listing 210 and the second listing 220 are in the same row. Thus, as observed in the example above regarding the user interface 200b of FIG. 2B, the user interface 200c only includes one of the two listings from Row 25. In particular, because the second listing 220 is determined to be superior to the first listing 210, only the second listing 220 is displayed and the first listing 210 is removed from display. Additionally, the third listing 230 is the only listing on Row 24, and so the third listing 230 is included in the user interface 200c.

As between the fourth listing 240 and the fifth listing 250, because they are on the same row, a determination may be made as to which is superior and the superior listing may be displayed and the inferior listing may be removed from display. If superiority were based off of a user preference for an aisle seat and if Row 1 includes seats beyond Seat 6, the fifth listing 250 may be superior to the fourth listing 240, even if the fifth listing 250 had been more expensive. Thus, the user interface 200c may include the first listing 210, the third listing 230, and the fifth listing 250. Additionally or alternatively, if superiority were based off of price alone, the fifth listing 250 may be superior to the fourth listing 240. Additionally or alternatively, if superiority were based off of multiple properties, such as price, a user preference for aisle seats, and a user preference of a particular delivery method, with a weighting factor more heavily favoring price, the fifth listing 250 may be superior to the fourth listing 240. However, if the fourth listing 240 had the user-preferred delivery method and the weighting factor heavily favored that delivery method, the fourth listing 240 may be superior to the fifth listing 250.

In some embodiments, if the user has selected a quantity of tickets less than the number available for a listing or if the user has not selected a quantity of tickets, the user interface 200c may display fewer than the total quantity of tickets available. For example, if the user has selected a quantity of one ticket, the first listing may display as a quantity of one, despite having three tickets available. Additionally or alternatively, if the user has not selected a quantity of tickets, the full quantity may be listed, such as three tickets available associated with the first listing 210 and only one ticket for the fifth listing 250.

In some embodiments, the user interface 200b and/or 200c may include a feature to cause the display to include the excluded listings. For example, with reference to FIG. 2C, after invoking such a feature the second and fourth listings 220 and 240 may be added to the user interface 200c.

Modifications, additions, or omissions may be made to FIGS. 2A, 2B and 2C without departing from the scope of the present disclosure. For example, the user interfaces 200a, 200b, and/or 200c may include more or fewer elements than those illustrated and described in the present disclosure. For example, the user interfaces 200b and/or 200c may display more properties than those illustrated. As another example, the listings may be for products or services, rather than tickets. As an additional example, the user interfaces 200a, 200b, and/or 200c may be a portion of a larger user interface that may include an interactive visual element, such as that illustrated in FIG. 3 or 4.

Figure 3:
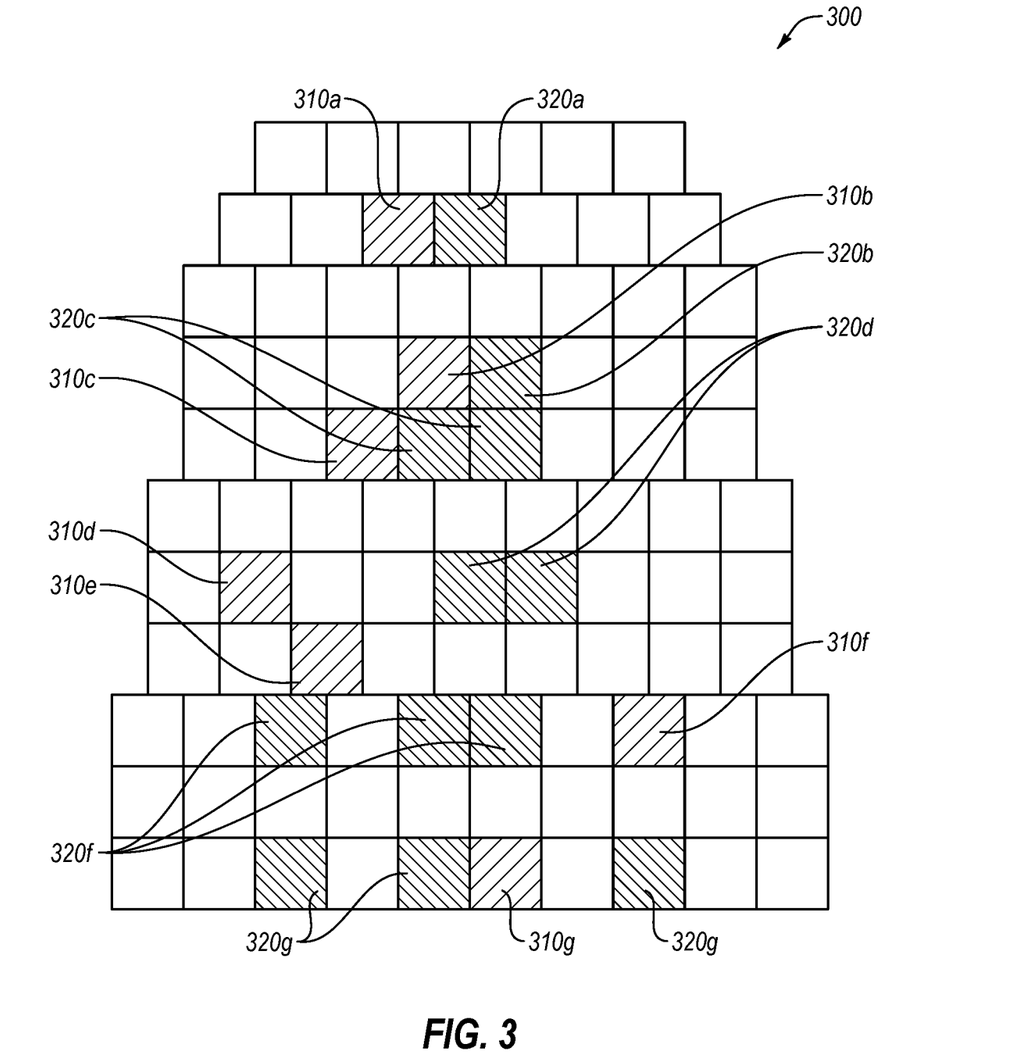
FIG. 3 illustrates an example interactive visual element.

FIG. 3 illustrates an example interactive visual element 300, in accordance with one or more embodiments of the present disclosure. The interactive visual element 300 may be part of a user interface provided to a user. For example, the user interface may include the user interface 200b from FIG. 2B and the interactive visual element 300 from FIG. 3.

The interactive visual element 300 may represent a visual depiction of one or more listings responsive to a search request from a user. For example, if a user selected a particular region of a venue for an event for ticket sales, the interactive visual element 300 may represent an interactive map of seats in the section (as illustrated in FIG. 3). In some embodiments, the interactive visual element 300 may display listings that are displayed to the user (included listings 310) in one format while displaying listings that are excluded from the display (excluded listings 320) to the user in a different format. For example, the included listings 310 may be in a different shading, color, texture, or other visual representation to distinguish the included listings 310 from the excluded listings 320 and/or seats not for sale.

In some embodiments, the included listings 310 may have a corresponding textual description of the listing included (for example, as illustrated in FIG. 2B or 2C) while excluded listings 320 may not have a corresponding textual description (for example, as illustrated in FIG. 2B or 2C when compared with FIG. 2A).

By way of example with reference to FIG. 3, the first row of the interactive visual element 300 may not have any seats for sale and so may be in a first format. The included listing 310a may have a corresponding textual description provided to a user and so may be displayed in a second format. The excluded listing 320a may not have a corresponding textual description provided to the user and so may be displayed in a third format. In particular, the included listing 310a and the excluded listing 320a may be on the same row and the included listing 310a may be superior such that the excluded listing 320a does not have details of the listing displayed to the user.

Continuing the example, the included listings 310b and 310c may be displayed in the second format. The excluded listings 320b and 320c may be displayed in the third format. In some embodiments, the excluded listings 320b and 320c may be excluded listings because the excluded listings 320b and 320c are on the same row as a superior listing and the excluded listings 320b and 320c may be determined to be inferior. The excluded listings 320b and 320c may be displayed in the third format. As illustrated in the excluded listings 320c, multiple listings in a single row may be excluded from the interactive visual element 300. Additionally, the included listing 310d may be superior to the excluded listings 320d, the included listing 310e may be the only listing on its row, and the included listings 310f and 310g may be superior to the excluded listing 320f and 320g, respectively. As illustrated in FIG. 3, in some embodiments, each row may only include one included listing 310 and all other listings for a given row may be excluded listings 320.

In some embodiments, seats not for sale and/or the excluded listings 320 may be depicted in a non-descript color such as white, gray, or black, or in a color to signify they are not displayed such as red, orange, or yellow and the included listings 310 may be depicted in a brighter color such as green or yellow.

In some embodiments, the interactive visual element 300 may be implemented using code implemented by the device of the user (e.g., the first device 120 of FIG. 1). For example, the interactive visual element 300 may be implemented using Javascript or Hypertext markup language (HTML). The device of the user may execute such user-device code. Based on the execution of the user-device code, the user may interact with the interactive visual element 300 to change a configuration of the interactive visual element 300.

For example, the interactive visual element 300 may include elements through which a user may interact with the interactive visual element 300. The user-device code executed by the device of the user may obtain the user interactions and change the configuration of the interactive visual element 300 accordingly. For example, the configuration of the interactive visual element 300 may change by changing the section of the venue displayed in the map. Alternately or additionally, the user-device code may request additional data from a server (e.g., the server 110 of FIG. 1), such as images, listings, or other information.

Modifications, additions, or omissions may be made to FIG. 3 without departing from the scope of the present disclosure. For example, the interactive visual element 300 may include more or fewer elements than those illustrated and described in the present disclosure. For example, the interactive visual element 300 may be part of a user interface that includes a textual description of included listings.

Figure 4:
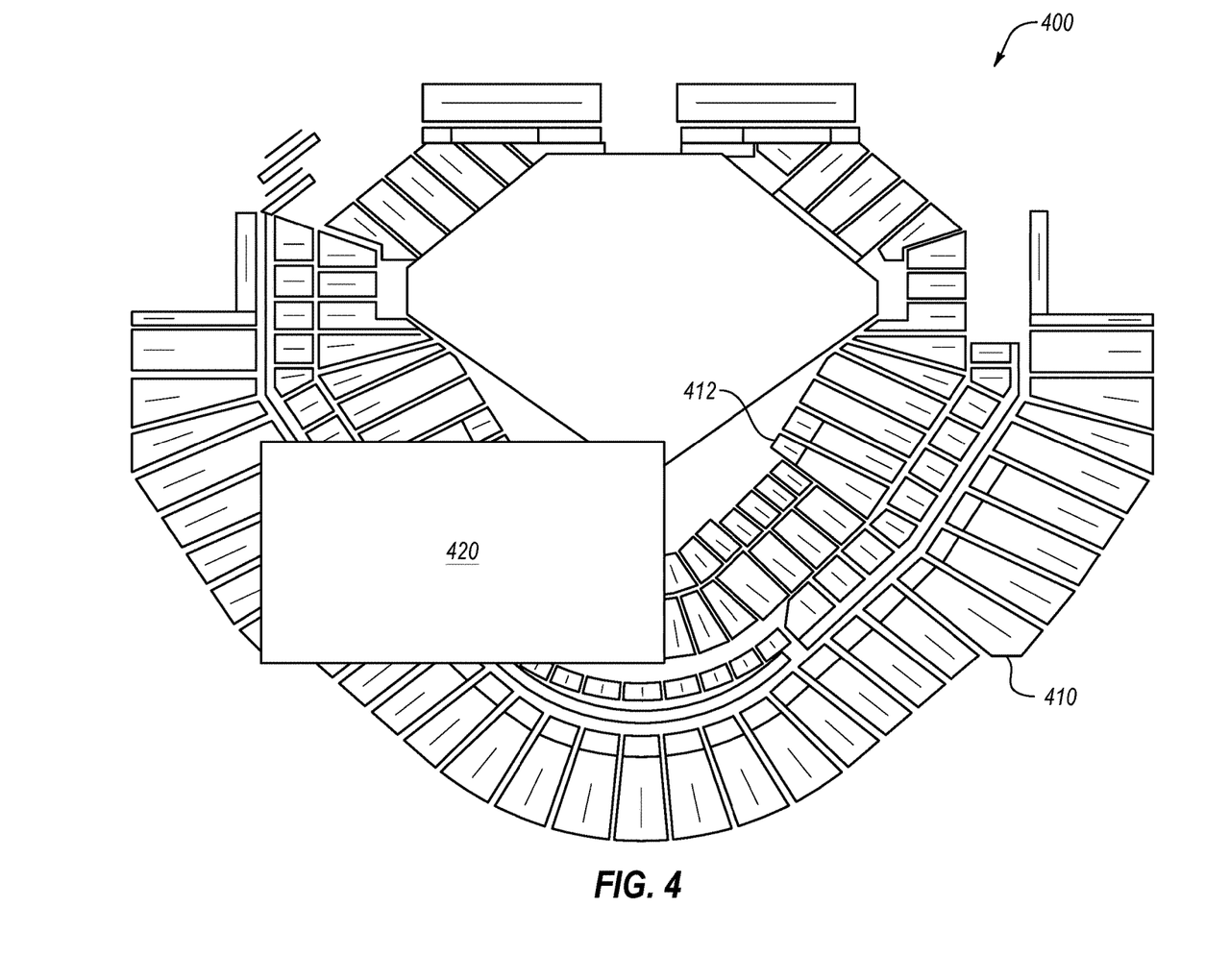
FIG. 4 illustrates another example of an interactive visual element.

FIG. 4 illustrates another example of an interactive visual element 400, in accordance with one or more embodiments of the present disclosure. The interactive visual element 400 may include a venue map 410 with one more sections (e.g., section 412) depicting a venue with listings of seats for purchase. The interactive visual element 400 may additionally include a window 420 for displaying listings.

The interactive visual element 400 may be configured such that a user displaying the interactive visual element 400 may select one or more features of the interactive visual element 400 to interact with the user interface. Interacting with the user interface may allow the user to perform a query, refine a query, examine a listing, etc. For example, if a user were to click on the section 412 of the venue map 410, the window 420 may display a textual description of listings in that section, such as that depicted by the user interface 200b of FIG. 2B.

In some embodiments, the window 420 may be sized and/or positioned to overlay portions of the venue map 410, for example, as illustrated in FIG. 4. In these and other embodiments, the window 420 may be sized and/or positioned based on the display properties of the display of the device used by the user. For displays with lower resolution and/or smaller display areas, the window 420 may overlay a larger portion of the venue map 410. For displays with high resolution and/or larger display areas, the window 420 may overlay a smaller portion of the venue map 410.

In some embodiments, the display of listings in the window 420 may exclude listings in accordance with the present disclosure. For example, if the user selected the section 412, the window 420 may exclude listings from section 412 that are on the same row and inferior to another listing.

By selecting a section of the venue map 410, in some embodiments the interactive visual element 400 may display the venue map 410 replaced with a map of the selected section. For example, the interactive visual element 400 may include a map of a section as illustrated in FIG. 3 rather than the entire venue map 410 as illustrated in FIG. 4. In these and other embodiments, the window 420 may overlay a portion of the map of the section.

In some embodiments, the venue map 410 may be formatted in a similar manner to that described with reference to FIG. 3. For example, portions of the venue map 410 may be formatted a first way for seats included in the window 420, and a second way for listings excluded from the window 420. In some embodiments, the seats included in the window 420 may be formatted in the same manner as the rest of the venue map 410. Additionally or alternatively, the seats excluded from the window 420 may be formatted in the same manner as the rest of the venue map 410. As another example, the seats excluded from the window 420 and the seats included in the window 420 may be formatted differently from each other and from the rest of the venue map 410.

Modifications, additions, or omissions may be made to FIG. 4 without departing from the scope of the present disclosure. For example, the interactive visual element 400 may include more or fewer elements than those illustrated and described in the present disclosure. For example, the interactive visual element 400 may include additional features, links, or aspects of interacting with the interactive visual element 400 not illustrated.

FIGS. 5A and 5B include a flowchart of an example computer-implemented method 500 of removal of listings based on superiority. The method 500 may be performed by any suitable system, apparatus, or device. For example, the system 100 of FIG. 1 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

At block 510, a search request may be received for an event at a venue with multiple rows. For example, a user may submit a request via a device (e.g., the first device 120 or the second device 130 of FIG. 1) to a server (e.g., the server 110 of FIG. 1) to be provided with listings, such as tickets for sale. In some embodiments, such a request may be submitted by the user interacting with an interactive visual element (e.g., selecting a section of a venue map).

At block 520, a quantity selection may be received. For example, a user may include a quantity selection as part of the search request of block 510, or may submit a quantity selection independently. The user may select the quantity by interacting with the device of the user and the device may transmit the user selection to the server.

At block 530, a first and a second listing in the same row may be retrieved based on the search request. For example, the server may recall the first and second listings from a storage device of the server housing a network-based commerce system, or may request and receive the listings from another computer system.

At block 540, user preferences may be retrieved. For example, a user may select preferences in advance of a search, such as a preference for aisle seats, credit card payment method, and electronic delivery of tickets. In some embodiments, the user preferences may include a preference for ticket quantity. Additionally or alternatively, the user preferences may include a weighting factor for one or more of the user preferences such that one or more of the user preferences weigh more heavily than others, or such that one or more properties weigh more heavily than others in determining which of multiple listings is superior.

At block 550, a determination may be made as to which of the first and second listings is selected for display and which is selected for exclusion from display. For example, the server may compare one or more values of properties of the first and second listing to determine which is superior. In some embodiments, the weighting factor may be used in determining superiority.

At block 560, instructions to generate a user interface that includes the superior listing and excludes the inferior listing may be generated to be displayed at a remote device. For example, the server may generate the instructions to instruct the remote device to generate such a user interface.

At block 570, instructions to generate an interactive visual element depicting the first and the second listings as part of the user interface may be generated. For example, a venue map or section map that includes the row of the first listing and the second listing may be part of the user interface. In these and other embodiments, the venue map or section map may be one with which a user may interact.

At block 580, instructions to generate a window that overlays part of the interactive visual element may be generated. Such a window may display a single listing for each of at least two of the rows.

At block 590, the instructions to generate the user interface may be transmitted to the remote location. For example, the server may transmit the instructions to generate the user interface over a network to the device that submitted the request at block 505.

Accordingly, the method 500 may remove listings based on superiority. Modifications, additions, or omissions may be made to the method 500 without departing from the scope of the present disclosure. For example, any of the blocks 520, 540, 570, and/or 580 may be omitted. As another example, the operations of the method 500 may be implemented in differing order, such as the blocks 510 and 520. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6A:
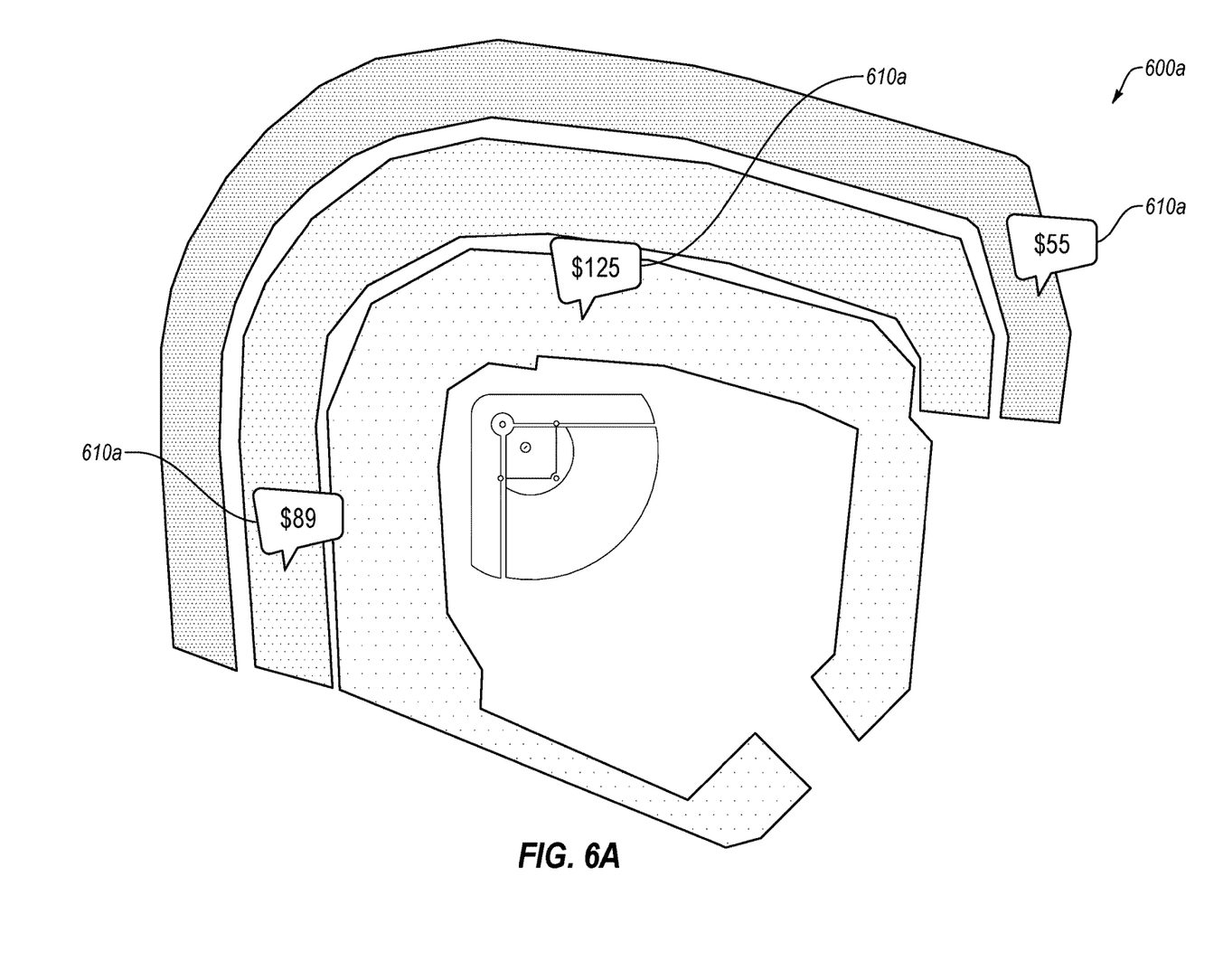
FIGS. 6A-6C illustrate example interactive visual elements as various selections are made.
Figure 6B:
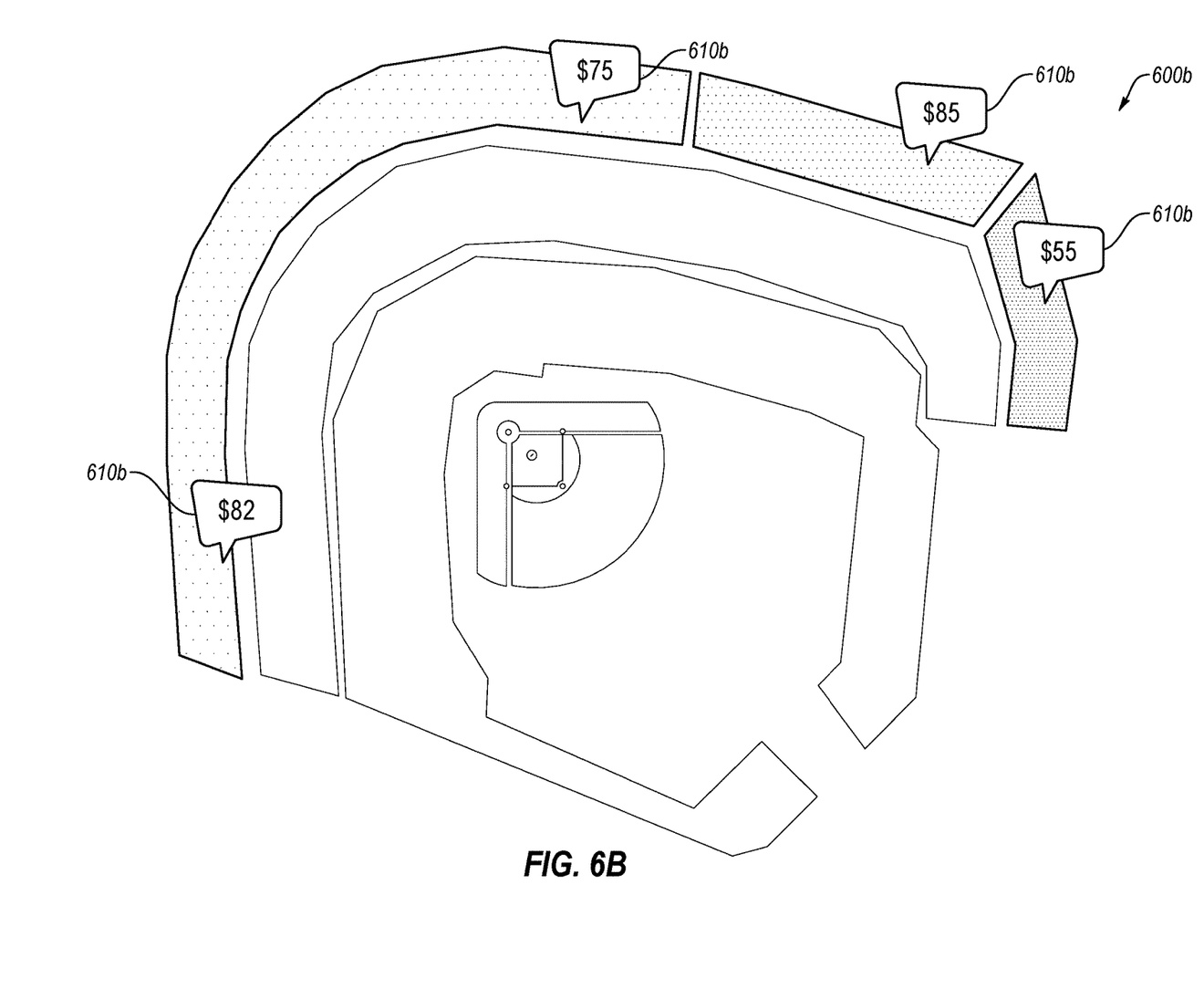
Figure 6C:
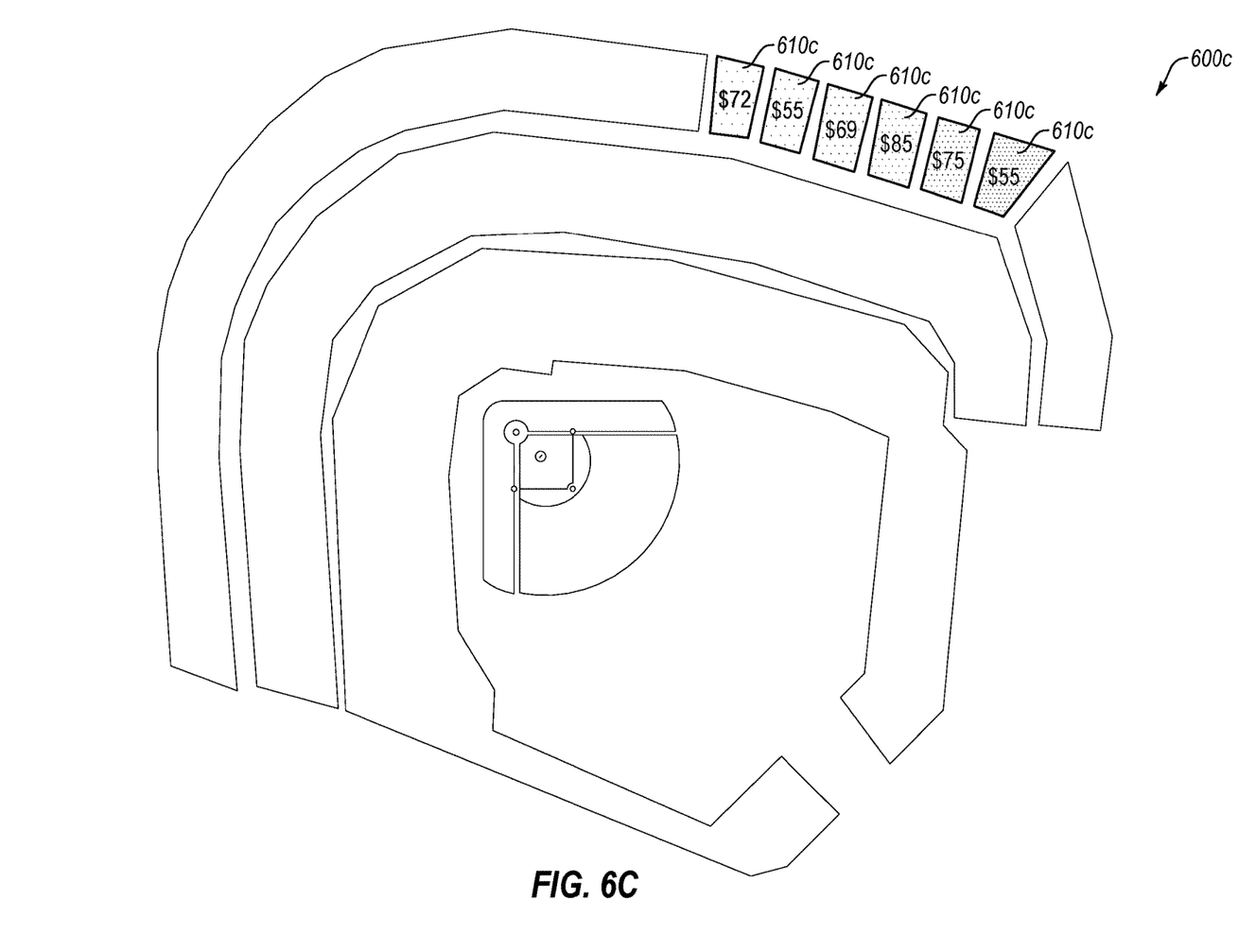

FIGS. 6A-6C illustrate example interactive visual elements 600a, 600b, and 600c as various selections are made, in accordance with one or more embodiments of the present disclosure. FIG. 6A illustrates an embodiment in which a superior listing in each level is shown, FIG. 6B illustrates an embodiment in which a superior listing in each zone of a level is shown, and FIG. 6C illustrates an embodiment in which a superior listing in each section is shown. While the present disclosure has been provided with reference to a superior listing in a row, the principles and teachings of the present disclosure may be used to present a superior listing in a level, a zone, a section, a region, etc. FIGS. 6A-6C may illustrate an example in which a user of the interactive visual elements 600a, 600b, and 600c may progressively select a level from the interactive visual element 600a, a zone from the interactive visual element 600b, and a section from the interactive visual element 600c.

FIG. 6A illustrates the interactive visual element 600a. The interactive visual element 600a includes superior listings 610a for each of the levels. For example, in some embodiments, only a single listing may be displayed for each level. A user of the interactive visual element 600a may select one or more of the listings displayed in association with the interactive visual element 600a, or may select one of the levels. The superior listings 610a for each level may be selected in a similar or comparable manner to that described in the present disclosure with respect to a row.

FIG. 6B illustrates the interactive visual element 600b. The interactive visual element 600b includes superior listings 610b for each of the zones of a level. For example, if the user selected the top level from the interactive visual element 600a, the interactive visual element 600b may be presented to the user with each zone of the selected level displaying the superior listings 610b. The superior listings 610b for each zone may be selected in a similar or comparable manner to that described in the present disclosure with respect to a row.

FIG. 6C illustrates the interactive visual element 600c. The interactive visual element 600c includes superior listings 610c for each of the sections of a zone. For example, if the user selected a zone from the interactive visual element 600b, the interactive visual element 600c may be presented to the user with each section of the selected zone displaying the superior listings 610c. The superior listings 610c for each section may be selected in a similar or comparable manner to that described in the present disclosure with respect to a row.

Modifications, additions, or omissions may be made to FIGS. 6A-6C without departing from the scope of the present disclosure. For example, the interactive visual elements 600a, 600b, and/or 600c may include more or fewer elements than those illustrated and described in the present disclosure. For example, the interactive visual elements 600a, 600b, and/or 600c may include additional features, links, or aspects of interacting with the interactive visual elements 600a, 600b, and/or 600c not illustrated.

As indicated above, the embodiments described herein may include the use of a special purpose or general purpose computer including various computer hardware or software modules, as discussed in greater detail below. Further, as indicated above, embodiments described herein may be implemented using computer-readable media for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

In some embodiments, the present disclosure may include a system that may include a device at a first location, and a server at a second location remove from the device. The server may include a processor and computer-readable instructions that, when executed by the processor, are configured to receive a search request from the device at the first location for an event at a venue with multiple rows, and retrieve a first listing and a second listing in a same row of the multiple rows based on the search request. The instructions may be further configured to determine which of the first listing and the second listing is a listing selected for display and which is a listing selected to not be displayed in the same row based at least on user preferences received from the device at the first location, and generate second instructions to be transmitted to the first location to generate a user interface to be displayed on the device at the first location where the user interface includes the listing selected for display and excludes the listing selected to not be displayed. The instructions may additionally be configured to transmit the second instructions to the device at the first location.

In some embodiments in accordance with the present disclosure, the instructions may further instruct the device at the first location to generate an interactive visual element depicting the listing selected for display as part of the user interface, and generate a window overlaying at least a portion of the interactive visual element, where the window displays a single listing for each of at least two of the multiple rows.

In some embodiments in accordance with the present disclosure, the interactive visual element includes a map of seats for the event with a first seat corresponding to the listing selected for display depicted in a first color and a second seat corresponding to the listing selected to not be displayed depicted in a second color.

In some embodiments, the present disclosure may include a method of generating a user interface to be displayed at a remote location. The method may include receiving a search request for an event at a venue with multiple rows, and retrieving a first listing and a second listing in a same row of the multiple rows based on the search request. The method may also include determining which of the first listing and the second listing is a listing selected for display and which is a listing selected to not be displayed in the same row. The method may additionally include generating instructions to be transmitted to a remote location to generate a user interface to be displayed at the remote location, the user interface including the listing selected for display and excluding the listing selected to not be displayed. The method may also include transmitting the instructions to the remote location.

In some embodiments in accordance with the present disclosure, the instructions may further instruct the remote location to generate an interactive visual element depicting the listing selected for display as part of the user interface, and generate a window overlaying at least a portion of the interactive visual element, the window displaying a single listing for each of at least two of the multiple rows.

In some embodiments in accordance with the present disclosure, the interactive visual element may include a map of seats for the event.

In some embodiments in accordance with the present disclosure, the map may include a first seat corresponding to the listing selected for display depicted in a first color and a second seat corresponding to the listing selected to not be displayed depicted in a second color.

In some embodiments in accordance with the present disclosure, the method may additionally include retrieving one or more user preferences, and determining which of the first listing and the second listing is a listing selected for display and which is a listing selected to not be displayed is based on the one or more user preferences.

In some embodiments in accordance with the present disclosure, the first listing is a primary listing and the second listing is a secondary listing.

In some embodiments in accordance with the present disclosure, the method may additionally include receiving a quantity selection, and determining which of the first listing and the second listing is a listing selected for display and which is a listing selected to not be displayed is based on the quantity selection.

In some embodiments in accordance with the present disclosure, determining which of the first listing and the second listing is a listing selected for display and which is a listing selected to not be displayed is based on multiple properties of the first listing and the second listing, and the method may further comprise utilizing a weighting factor for at least one of the multiple properties, where the weighting factor is pre-selected by a user.

In some embodiments in accordance with the present disclosure, determining which of the first listing and the second listing is a listing selected for display and which is a listing selected to not be displayed is based on at least two of view, zone, section, price, seat features, delivery method, payment method, and date of the event.

In some embodiments in accordance with the present disclosure, a non-transitory computer-readable medium may include instructions that, when executed by one or more processors, are configured to control operations. The operations may include steps or operations associated with methods in accordance with the present disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing that the terms "first," "second," "third," etc., connote a specific order, these terms should not be understood to connote a specific order.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
   a processor; and
   one or more non-transitory computer-readable media containing instructions that, when executed by the processor, are configured to cause the system to perform operations comprising:
      receive a search request from a device for an event at a venue with a plurality of rows and a plurality of zones;
      retrieve a first listing and a second listing in a same row of the plurality of rows for a particular zone of the plurality of zones as responsive to the search request;
      determine which of the first listing and the second listing is a listing selected to be displayed and which is a listing selected to not be displayed based at least on user preferences received from the device such that only a single representative listing is displayed for the same row despite both the first listing and the second listing being responsive to the search request;
      generate second instructions to be transmitted to the device to generate a user interface to be displayed on the device, the user interface including the listing selected to be displayed as the single representative listing for the same row; and
      transmit the second instructions to the device.

2. The system of claim 1, wherein the instructions further instruct the device to:
   generate an interactive visual element depicting the listing selected for display as part of the user interface; and
   generate a window overlaying at least a portion of the interactive visual element, the window displaying a single listing for each of at least two of the plurality of rows.

3. The system of claim 2, wherein the interactive visual element includes a map of seats for the event with a first seat corresponding to the listing selected for display depicted in a first color and a second seat corresponding to the listing selected to not be displayed depicted in a second color.

4. A method of generating a user interface to be displayed at a device, the method comprising:
   receiving a search request for an event at a venue with a plurality of rows and a plurality of zones;
   retrieving a first listing and a second listing in a same row of the plurality of rows for a particular zone of the plurality of zones as responsive to the search request;
   determine which of the first listing and the second listing is a listing selected to be displayed and which is a listing selected to not be displayed based at least on user preferences received such that only a single representative listing is displayed for the same row despite both the first listing and the second listing being responsive to the search request;
   generating instructions to be transmitted to a device to generate a user interface to be displayed at the device, the user interface including the listing selected to be displayed as the single representative listing for the same row; and
   transmitting the instructions to the device.

5. The method of claim 4, wherein the instructions further instruct the device to:
   generate an interactive visual element depicting the listing selected to be displayed as part of the user interface; and generate a window overlaying at least a portion of the interactive visual element, the window displaying a single listing for each of at least two of the plurality of rows.

6. The method of claim 5, wherein the interactive visual element includes a map of seats for the event.

7. The method of claim 6, wherein the map includes a first seat corresponding to the listing selected for display depicted in a first color and a second seat corresponding to the listing selected to not be displayed depicted in a second color.

8. The method of claim 4, further comprising:
retrieving one or more user preferences,
wherein determining which of the first listing and the second listing is a listing selected to be displayed and which is a listing selected to not be displayed is based on the one or more user preferences.

9. The method of claim 4, wherein the first listing is a primary listing and the second listing is a secondary listing.

10. The method of claim 4, further comprising:
receiving a quantity selection,
wherein determining which of the first listing and the second listing is a listing selected to be displayed and which is a listing selected to not be displayed is based on the quantity selection.

11. The method of claim 4, wherein determining which of the first listing and the second listing is a listing selected to be displayed and which is a listing selected to not be displayed is based on a plurality of properties of the first listing and the second listing and utilizing a weighting factor for at least one of the plurality of properties, the weighting factor pre-selected by a user.

12. The method of claim 4, wherein determining which of the first listing and the second listing is a listing selected to be displayed and which is a listing selected to not be displayed is based on at least two of view, zone, section, price, seat features, delivery method, payment method, and date of the event.

13. A non-transitory computer-readable medium including instructions that, when executed by one or more processors, are configured to control operations, the operations including:
receiving a search request for an event at a venue with a plurality of rows and a plurality of zones;
retrieving a first listing and a second listing in a same row of the plurality of rows for a particular zone of the plurality of zones as responsive to the search request;
determining which of the first listing and the second listing is a listing selected to be displayed and which is a listing selected to not be displayed based at least on user preferences received;
generating second instructions to be transmitted to a device to generate a user interface to be displayed at the device, the user interface including the listing selected to be displayed as the single representative listing for the same row; and
transmitting the second instructions to the device.

14. The computer-readable medium of claim 13, wherein the second instructions further instruct the device to:
generate an interactive visual element depicting the listing selected to be displayed as part of the user interface; and
generate a window overlaying at least a portion of the interactive visual element, the window displaying a single listing for each of at least two of the plurality of rows.

15. The computer-readable medium of claim 14, wherein the interactive visual element includes a map of seats for the event.

16. The computer-readable medium of claim 15, wherein the map includes a first seat corresponding to the listing selected for display depicted in a first color and a second seat corresponding to the listing selected to not be displayed depicted in a second color.

17. The computer-readable medium of claim 16, wherein the operations further comprise:
retrieving one or more user preferences,
wherein determining which of the first listing and the second listing is a listing selected to be displayed and which is a listing selected to not be displayed is based on the one or more user preferences.

18. The computer-readable medium of claim 14, wherein the first listing is a primary listing and the second listing is a secondary listing.

19. The computer-readable medium of claim 14, wherein the operations further comprise:
receiving a quantity selection,
wherein determining which of the first listing and the second listing is a listing selected to be displayed and which is a listing selected to not be displayed is based on the quantity selection.

20. The computer-readable medium of claim 14, wherein determining which of the first listing and the second listing is a listing selected to be displayed and which is a listing selected to not be displayed is based on at least two of view, zone, section, price, seat features, delivery method, payment method, and date of the event.

* * * * *